United States Patent [19]

Takahashi

[11] Patent Number: 5,469,470
[45] Date of Patent: Nov. 21, 1995

[54] SPREAD SPECTRUM COMMUNICATION SYSTEM USING TWO-PREDETERMINED-CODE PSEUDO-NOISE SIGNALS

[75] Inventor: Satoshi Takahashi, Yokohama, Japan

[73] Assignee: Ricoh Company Ltd., Tokyo, Japan

[21] Appl. No.: 177,328

[22] Filed: Jan. 4, 1994

[30] Foreign Application Priority Data

Jan. 8, 1993 [JP] Japan ................................. 5-18114

[51] Int. Cl.⁶ ................................ H04L 9/00; H04J 13/02
[52] U.S. Cl. ............................. 375/205; 375/208; 380/34; 380/46
[58] Field of Search ....................... 375/1; 380/34, 380/46

[56] References Cited

U.S. PATENT DOCUMENTS

5,164,985 11/1992 Nysen et al. .................................. 375/1

Primary Examiner—David C. Cain
Attorney, Agent, or Firm—Oblon, Spivak, McClelland, Maier, & Neustadt

[57] ABSTRACT

A transmission terminal modulates, for a first state of given data signal, a non-return-to-zero code pseudo-noise signal onto a carrier band. Further, the terminal modulates, for a second state of the given data signal a Manchester-code pseudo-noise signal onto the carrier band. The terminal then sends a communication signal comprising the non-return-to-zero-code pseudo-noise signal and the Manchester-code pseudo-noise signal. A receiving terminal receives the communication signal and then uses, as an error signal, a signal resulting from multiplication of first and second correlation signals, the first correlation signal concerning the correlation between the communication signal, a reference pseudo-noise signal, and a clock signal which is used for generating the reference pseudo-noise signal, and the second correlation signal concerning the correlation between the communication signal and the reference pseudo-noise signal. The receiving terminal then demodulates the communication signal by comparing between magnitudes of the first and second correlation signals.

21 Claims, 12 Drawing Sheets

FIG. 1A
TRANSMITTER

FIG. 1B
RECEIVER

FIG. 2

TRANSMITTER
(1ST EMBODIMENT)

FIG. 3
RECEIVER (1ST EMBODIMENT)

FIG. 5
RECEIVER (3RD EMBODIMENT)

FIG. 6
RECEIVER (4TH EMBODIMENT)

FIG. 7

TRANSMITTER (2ND EMBODIMENT)

FIG. 8

RECEIVER (5TH EMBODIMENT)

FIG. 9
RECEIVER (6TH EMBODIMENT)

FIG. 10

TRANSMITTER (3RD EMBODIMENT)

FIG. 11A
NRZ
(NON-RETURN TO ZERO) CODE

FIG. 11B
MANCHESTER CODE

FIG. 12A
OUTPUT OF MULTIPLYING
OUTPUTS FROM CORRELATOR

FIG. 12B
OUTPUT OF MULTIPLYING
OUTPUTS FROM CORRELATOR

SPREAD SPECTRUM COMMUNICATION SYSTEM USING TWO-PREDETERMINED-CODE PSEUDO-NOISE SIGNALS

BACKGROUND OF THE INVENTION

The present invention relates to a spread spectrum communication system, which may be used for radio-frequency communication.

Figure 1A:
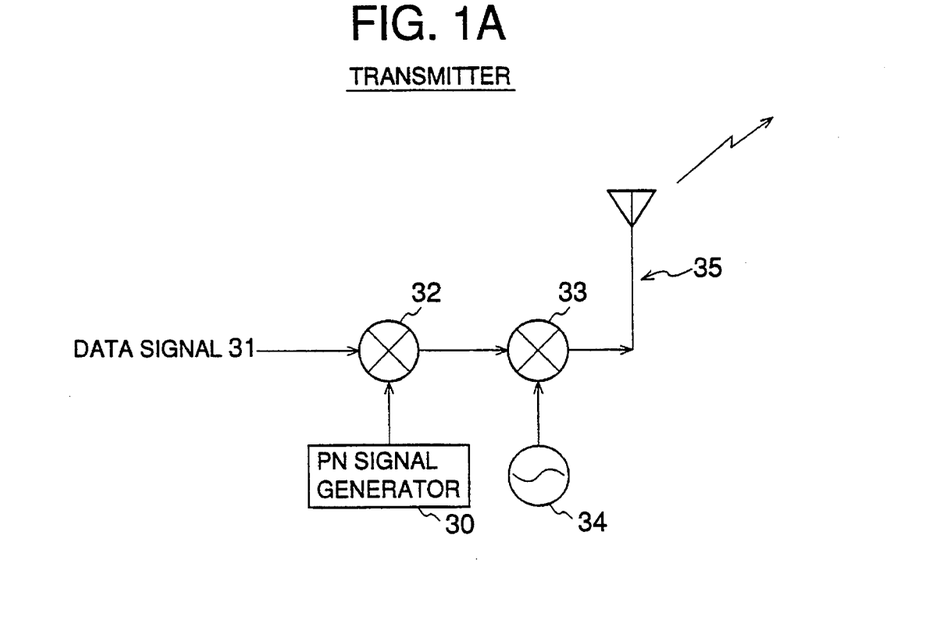
FIGS. 1A and 1B show block diagrams of a DS system as an example of a spread spectrum communication system.
Figure 1B:
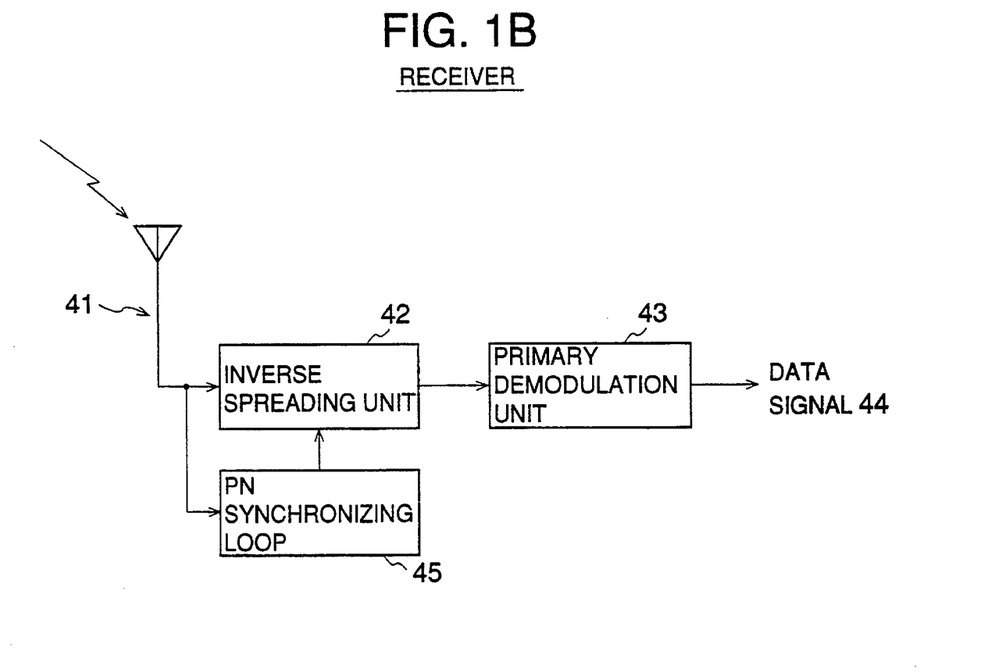

FIGS. 1A and 1B show an example of a spread spectrum communication system according to a DS (direct sequence) system in related art. FIG. 1A shows a block diagram of a transmitter thereof and FIG. 1B shows a block diagram of a receiver thereof. The transmitter comprises a pseudo noise (PN, hereinafter) signal generator 30, multipliers 32 and 33, a carrier generator 34 and a transmission antenna 35. The receiver comprises a receiving antenna 41, an inverse spreading unit, a primary demodulation unit 43, and a PN-synchronizing loop 45. (There, and hereinafter, each of devices PN synchronizing loop, phase synchronizing loop, and delay lock loop has a function of providing a reference (described below) PN signal which is produced as a result of being synchronized with a PN signal included in a received signal. Such synchronization is established as a result of circulation of an initial PN signal through the PN synchronizing loop. Such a function is similar to that of the so-called phase locked loop with regard to the basic function of keeping the phases of two signals constant relative to one another. Each of such devices as mentioned above used for realizing the present invention has a function of processing digital signals while generally speaking a phase locked loop has a function of processing analog signals.)

As shown in FIG. 1A, in the transmitter, a given data signal 31 and a PN signal provided by the PN signal generator 30 are multiplied by the multiplier 32 so that the data signal 31 is spread. Then, the spread data signal is multiplied, with a radio-frequency carrier supplied by the carrier generator 34, by means of the multiplier 33, so that the spread data signal is carried by the radio-frequency carrier and sent through the antenna 35. In the receiver, as shown in FIG. 1B, the PN synchronizing loop 45 such as a delay lock loop, for example, provides a PN signal so that the provided PN signal is synchronized with the PN signal included in the received signal received through the antenna 41. Inverse spreading is performed on the received signal so that the PN signal is removed, by means of the inverse spreading unit 42, from the received signal using the synchronized PN signal provided by the synchronizing loop 45. Then, the carrier component associated with the received signal is removed by the primary demodulation unit 43. Thus, in such an example of a spread spectrum communication system according to the DS system mentioned above, in the receiver, a primary demodulating system such as the unit 43 is necessary. Such a primary demodulating system performs functions, such as reproduction of the carrier component and detection, for example, on the signal obtained as a result of the inverse spreading operation. Thus, the construction of the receiver of such an example is rather complicated and has a rather large circuit scale, leading to a high cost.

In Japanese Patent Application 4-183255, entitled *Spread-spectrum communication system,* the following system has been proposed: A first correlator measures a correlation between a Manchester-code PN signal and the received signal and a second correlator detects the correlation between a non-return-to-zero-code (NRZ-code, hereinafter) PN signal and the received signal. Then, the correlation outputs provided from the first and second correlators are multiplied so that a phase error signal concerning of PN signals is obtained. The phase error signal concerns a time error between the timing of the PN signal included in the received signal and the timing of the NRZ-code and Manchester-code (reference) PN signals. Thus, a synchronizing loop is formed.

SUMMARY OF THE INVENTION

An object of the present invention is to eliminate using the above-mentioned complicated-construction primary demodulating system in the data demodulation process. Thus, the arrangement of the resulting system may become rather simple, and thus economical. Further, the resulting arrangement may be incorporated with a spread spectrum communication system according to the DS system such as that described above with reference to FIGS. 1A and 1B. As a result, two data signals can be simultaneously transmitted by the resulting system so that efficient data transmission can be realized by the resulting spread spectrum communication system.

To achieve the above object of the present invention, a spread spectrum communication system according to the present invention comprises:

a transmission terminal comprising:

means for modulating, for a first state of a given data signal, a pseudo-noise signal of non-return-to-zero code onto a carrier band;

means for modulating, for a second state of said given data signal a pseudo-noise signal of Manchester code onto said carrier band; and means for then sending a communication signal comprising said pseudo-noise signal of non-return-to-zero code and said pseudo-noise signal of Manchester code;-and a receiving terminal for receiving said communication signal comprising:

synchronizing loop means for synchronizing of pseudo-noise signals, said synchronizing loop means using, as an error signal, a signal resulting from multiplication of first and second correlation signals, said first correlation signal concerning the correlation between said communication signal, a reference pseudo-noise signal, and a Clock signal which is used for generating said reference pseudo-noise signal, and said second correlation signal concerning the correlation between said communication signal and said reference pseudo-noise signal; and demodulating means for demodulating said communication signal by comparing between magnitudes of said first and second correlation signals.

Another arrangement of the above receiving terminal may comprise:

synchronizing loop means for synchronizing of pseudo-noise signals, said synchronizing loop means using, as an error signal, a signal resulting from multiplication of first and second correlation signals, said first correlation signal concerning the correlation between a received communication signal and a reference pseudo-noise signal of non-return-to-zero code, and said second correlation signal concerning the correlation between said received communication signal and a reference pseudo-noise signal of Manchester code; and demodulating means for demodulating said received communication signal by comparing between magnitudes of said first and second correlation signals.

Another arrangement of the above system may comprise:

a transmission terminal, for sending first and second data signals, comprising:

first modulating means for switching, using said first data signal, a pseudo-noise signal into either a non-return-to-zero code or a Manchester code so as to modulate said pseudo-noise signal; and second modulating means for multiplying said second data signal with the modulated pseudo-noise signal and a carrier signal so as to send the resulting signal as a communication signal; and a receiving terminal, for receiving said communication signal sent from said transmission terminal, comprising:

synchronizing loop means for synchronizing of pseudo-noise signals, said synchronizing loop means using, as an error signal, a signal resulting from multiplication of first and second correlation signals, said first correlation signal concerning the correlation between said communication signal, a reference pseudo-noise signal, and a clock signal which is used for generating said reference pseudo-noise signal, and said second correlation signal concerning the correlation between said communication signal and said reference pseudo-noise signal;

first demodulating means for demodulating said communication signal so as to obtain said first data signal by comparing between magnitudes of said first and second correlation signals; and second demodulating means for demodulating said communication signal so as to obtain said second data signal, by means of a primary demodulating system, as a result of adding said first and second correlation signals.

Another arrangement of the above receiving terminal may comprise:

synchronizing loop means for synchronizing of pseudo-noise signals, said synchronizing loop means using, as an error signal, a signal resulting from multiplication of first and second correlation signals, said first correlation signal concerning the correlation between a received communication signal and a reference pseudo-noise signal of non-return-to-zero code, and said second correlation signal concerning the correlation between said received communication signal and a reference pseudo-noise signal of Manchester code;

first demodulating means for demodulating said received communication signal, so as to obtain a first signal, by comparing between magnitudes of said first and second correlation signals; and second demodulating means for demodulating said received communication signal so as to obtain a second data signal, by means of a primary demodulating system, as a result of adding said first and second correlation signals.

An advantage resulting from the above arrangements is as follows: The transmission terminal modulates the given data signal by varying the code format of the pseudo-noise signal and the receiving terminal demodulates the received communication signal by comparing between the outputs from the correlators concerning pseudo-noise synchronizing loop. Thus, a complex primary demodulating system is not necessary and a rather simple arrangement is sufficient for data transmission. Consequently, a compact circuit scale and an economical system can be realized.

Other objects and further features of the present invention will become more apparent from the following detailed description when read in conjunction with the accompanying drawings.

DESCRIPTION OF THE PREFERRED EMBODIMENTS

Figure 2:
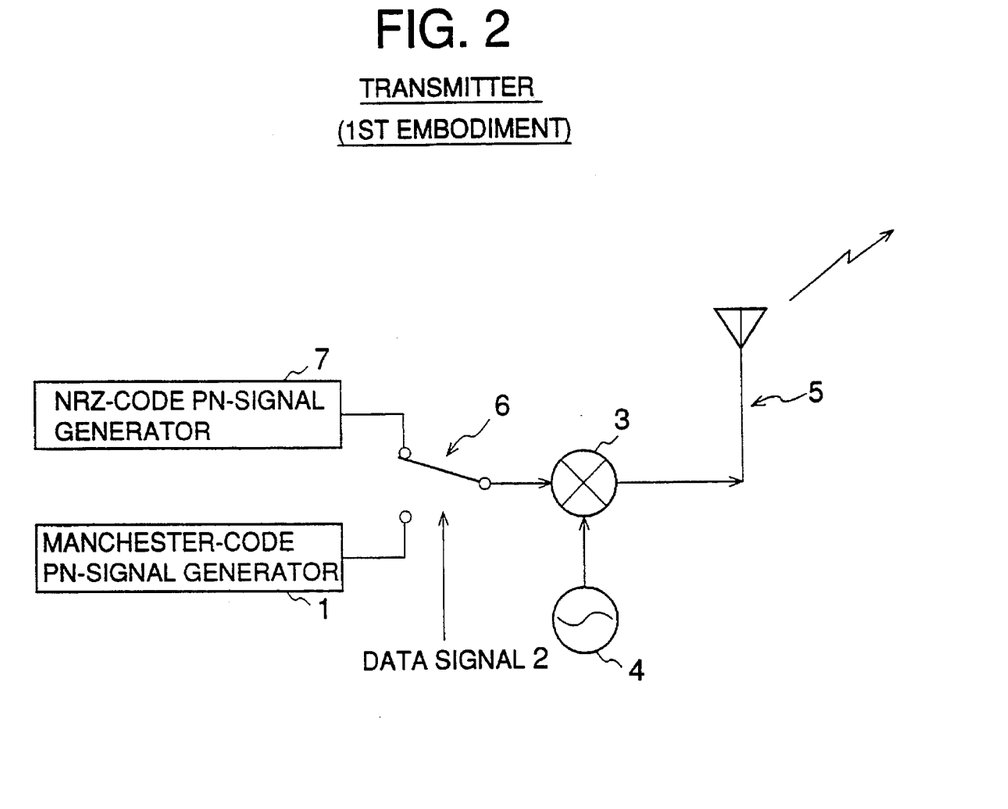
FIG. 2 shows a block diagram of a transmitter in a first embodiment of a spread spectrum communication system according to the present invention.

A first embodiment of a transmitter according to a spread spectrum communication system of the present invention will now be described with reference to FIG. 2. In FIG. 2, the transmitter comprises a Manchester-code pseudo-noise (PN, hereinafter)-signal generator 1, a multiplier or mixer 3, a carrier generator 4, a transmission antenna 5, a changeover switch 6, and a non-return-to-zero (NRZ, hereinafter)-code PN-signal generator.

Figure 11A:
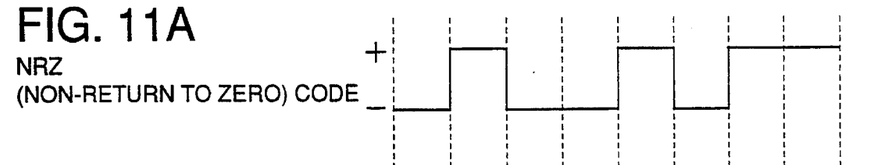
FIGS. 11A and 11B show NRZ (non-return-to-zero) and Manchester codes respectively.
Figure 11B:
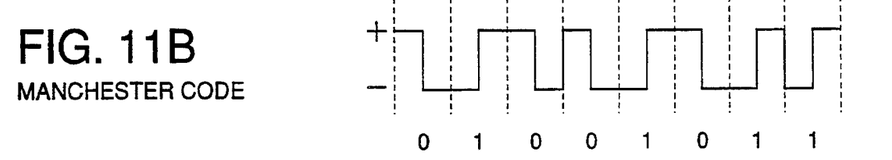

As shown in FIG. 11A, the NRZ code has a format wherein a negative voltage is assigned to an input logical value of 0 and a positive voltage is assigned to an input logical value of 1. Further, as shown in FIG. 11B, the Manchester code has a format wherein a state change from the positive to the negative voltage is assigned to the input logical value of 0 and a state change from the negative to the positive voltage is assigned to the input logical value of 1. The NRZ-code PN-signal generator 7 and Manchester-code PN-signal generator 1 generate the respective PN signals with the same bit series and generally in phase. Provision of the data signal 2 changes the state of the switch 6 so that the input of a data signal having a logical value of 0 causes the NRZ-code PN signal to be sent and the input of a data signal having a logical value of 1 causes the Manchester-code PN signal to be sent, for example. Then, the resulting PN-signal is multiplied with the carrier generated in the carrier generator 4 so that the resulting signal is sent through the antenna 5.

Normally, the NRZ-code PN-signal generator generates PN signal code value in response to one clock cycle of a clock signal which thus drives the NRZ-code PN-signal generator. Then, the Manchester-code PN signal provided be made as a result of performing an exclusive OR operation on the generated NRZ-code PN signal and the clock signal. According to such a principle, the arrangement shown in FIG. 10 may be devised as a third embodiment of a transmitter according to the present invention.

Figure 10:
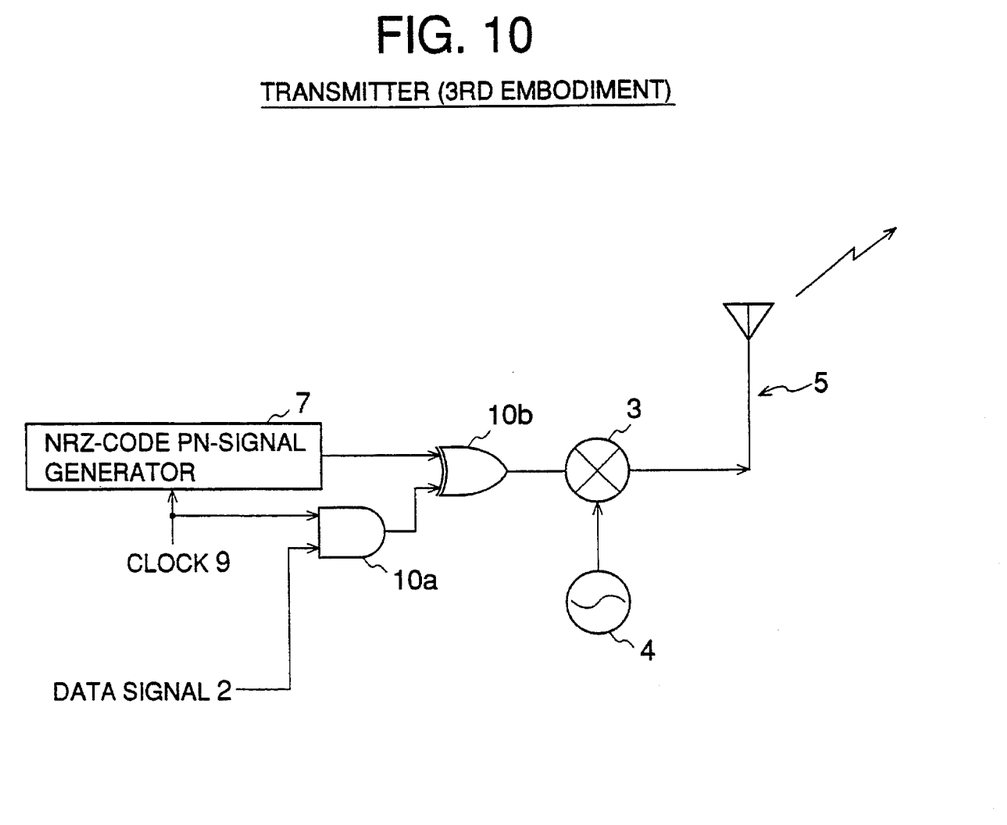
FIG. 10 shows a block diagram of a transmitter in a third embodiment of a spread spectrum communication system according to the present invention.

In FIG. 10, the same reference numerals are given to the components having substantially the same functions. The transmitter of FIG. 10 comprises an AND unit 10a which performs the logical product or AND operation on the clock signal and the given data signal. Thus, the AND unit 10a passes the clock signal when the given data signal has the logical value 1 and does not pass the same and thus provides the logical value 0 when the given data signal has the logical value 0. The output from the AND unit 10a and the PN signal provided from the NRZ-code PN-signal generator are exclusive ORed by means of the EX-OR unit 10b. As a result, if the given data signal has the logical value 1, the exclusive OR operation is performed on the NRZ-code PN signal and the clock signal and thus the Manchester-code PN signal is obtained. On the other hand, if the given data signal has the logical value of 0, the NRZ-code PN signal is output as it is. Consequently, the arrangement of FIG. 10 therefore functions similarly to that of FIG. 2.

Figure 3:
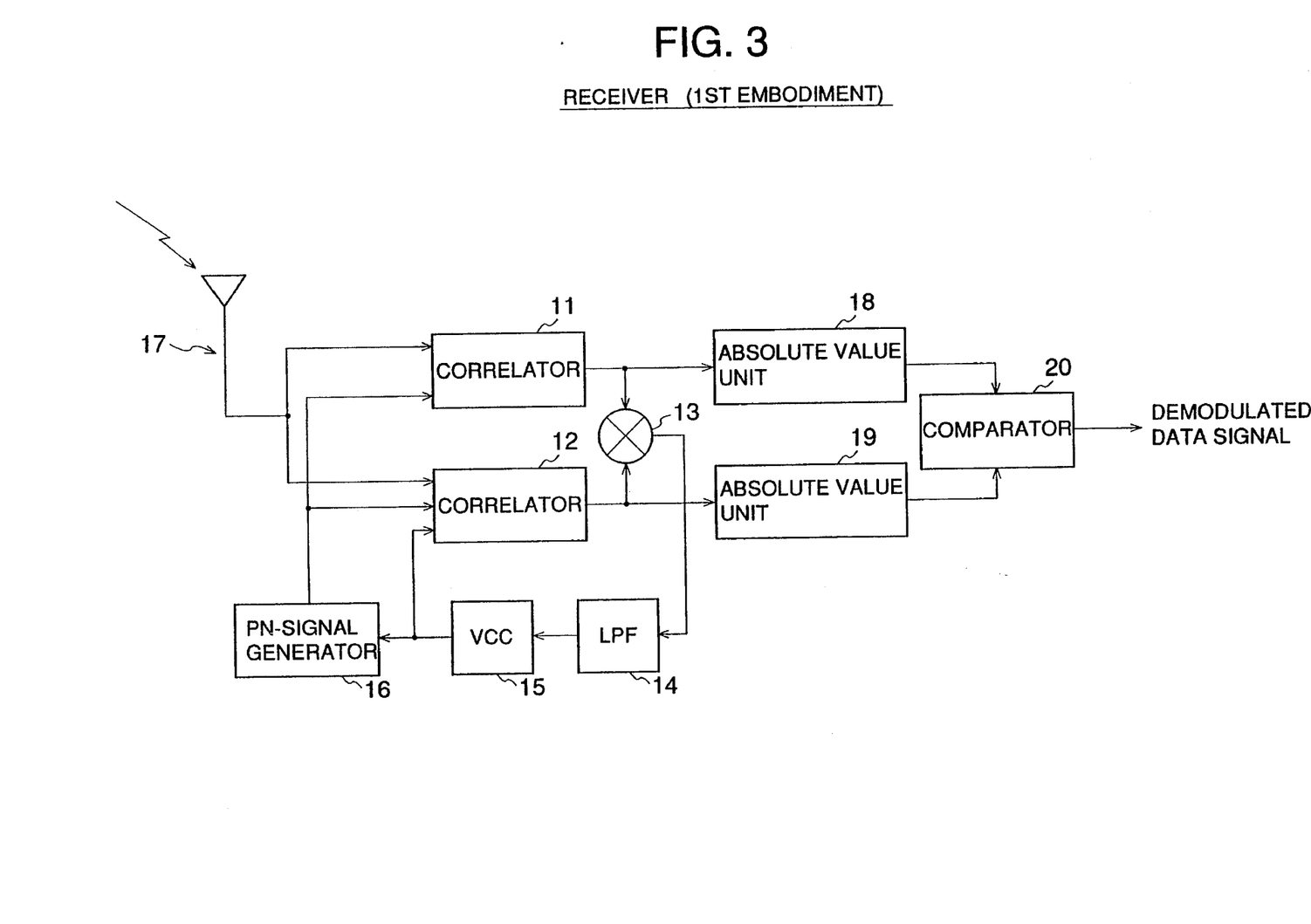
FIG. 3 shows a block diagram of a receiver in a first embodiment of a spread spectrum communication system according to the present invention.

A first embodiment of a receiver in a spread spectrum communication system according to in the present invention will now be described with reference to FIG. 3. In FIG. 3, the receiver comprises correlators 11 and 12, a multiplier 13, a low pass filter (LPF, hereinafter) 14, a voltage controlled clock generator (VCC, hereinafter) 15, a PN signal generator 16, a receiving antenna 17, absolute value units 18 and 19, and a comparator 20.

The correlator 11 obtains the correlation between the received signal $y(t)$ and the NRZ-code PN signal $P_N(t)$ generated from the PN-signal generator 16. The correlator 12 obtains the correlation between the received signal, the above PN signal $P_N(t)$ and the clock signal $C(t)$ supplied from the VCC 5. The PN-signal generator 16 used in the embodiment generates the PN signal code value in response to the provision of one cycle of the clock signal provided by the VCC 5. Hereinafter, the PN signal generated by the PN generator in the receiver will be referred to as a reference PN signal so as to distinguish it from the PN signal included in the received signal.

The multiplier 13 multiplies the signals output from the correlators 11 and 12, the multiplied signal being then filtered by means of the LPF 14. As a result, the low-frequency component thereof is extracted and the extracted signal is then supplied as a control signal to the VCC 15.

Further, the signals output from the correlators 11 and 12 are supplied to the absolute value units 18 and 19 as shown in FIG. 3, the magnitudes being then extracted there. Means for extracting magnitudes is not limited to such absolute value units as those (18 and 19) used in this embodiment. Square-law units, for example, each of which has a function of extracting the magnitudes, may be also used instead of the absolute value units 18 and 19. The signals output from the absolute value units 18 and 19 are provided to the comparator 20 so that the comparator 20 compares the output signals. As a result, the comparator 20 outputs the digital value 0 if the value associated with the signal output from the unit 18 is the greater of the two and outputs the digital value 1 if the value associated with the unit 19 is the greater, for example.

Figure 4:
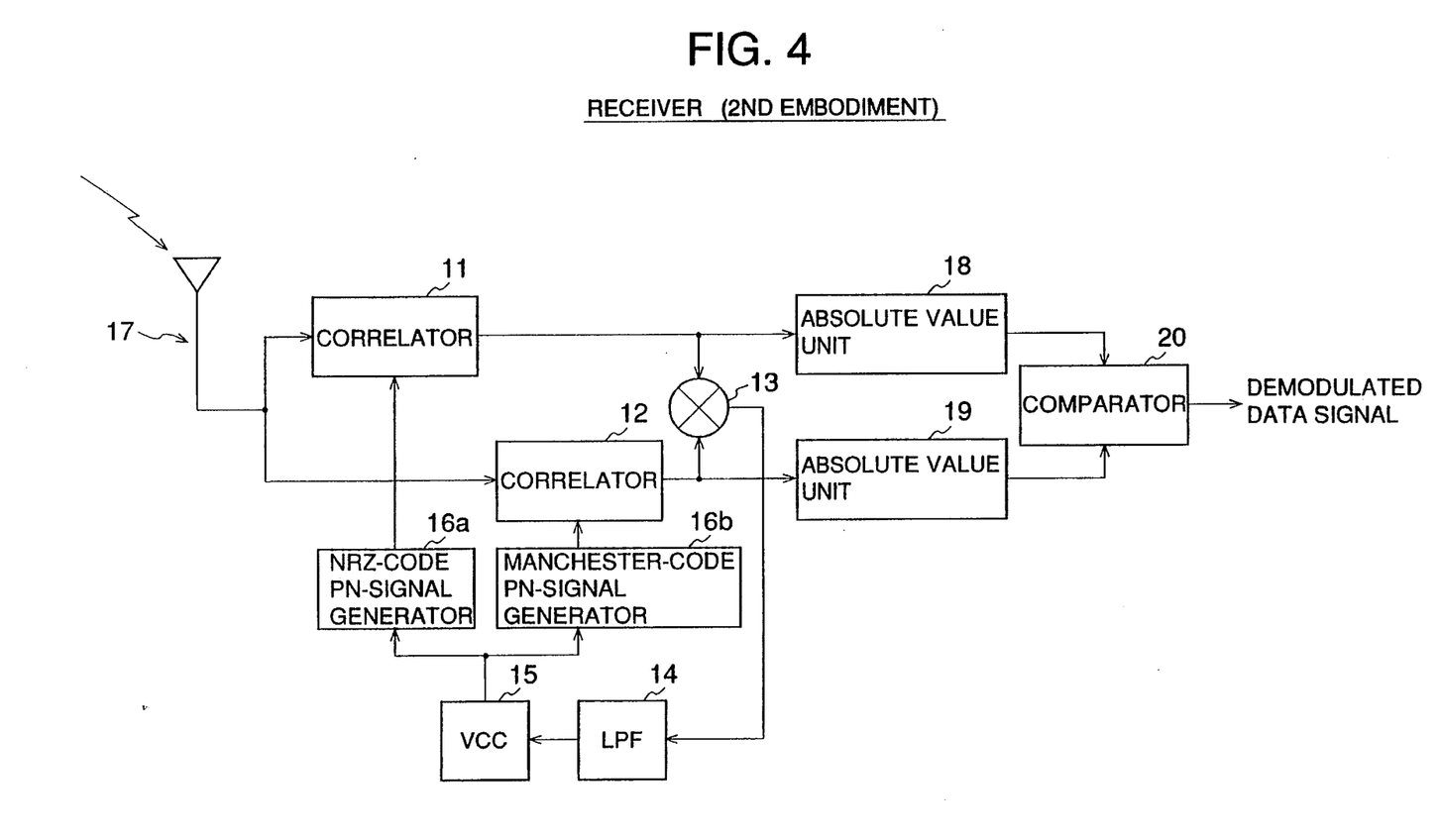
FIG. 4 shows a block diagram of a receiver in a second embodiment of a spread spectrum communication system according to the present invention.

A second embodiment of a receiver according to a spread spectrum communication system of the present invention will now be described with reference to FIG. 4. In FIG. 4, the receiver comprises an NRZ-code PN-signal generator 16a and a Manchester-code PN-signal generator 16b and the same reference numerals are given to the components having functions substantially the same as those of the corresponding components in FIG. 3.

The difference between the arrangements of FIG. 3 and FIG. 4 lines in the correlator 12, which difference is as follows: In FIG. 3, the correlator 12 obtains the correlation between the received signal, the PN signal and the clock signal. However, in FIG. 4, the NRZ-code and Manchester-code PN-signal generators 16a and 16b are provided and the correlator 12 obtains the correlation between the Manchester code reference PN signal and the received signal.

The principle of operations of the spread spectrum communication system according to the present invention will now be described. Hereinafter, the NRZ-code PN-signal will be referred to as $P_N(t)$ and the Manchester-code PN-signal will be referred to as $P_M(t)$. As described above, the PN signals $P_N(t)$ and $P_M(t)$ are of generally the same sequence, timing and phase. In FIG. 2, the angular frequency of the carrier generated by the carrier generator 4 will be referred to as $w_0$, and the phase of the carrier will be referred to as $\phi$. If the given data signal has the logical value of 0, the NRZ-code PN-signal is sent and the Manchester-code PN-signal is sent if the given data signal has the logical value of 1. Thus, the transmission signal $y(t)$ will be expressed by the following expressions (1) and (2):

$$y(t)=P_N\cos(w_0t+\phi) \text{ if the data signal has the logical value of 0; and}$$

$$y(t)=P_M\cos(w_0t+\phi) \text{ if the data signal has the logical value of 1 (2).}$$

Two kinds of transmission signals thus exist. Operations carried out by the receiver will now be described with reference to FIG. 4, which operations are carried out if the receiver receives the NRZ-code PN signal shown in the above expression (1).

In the correlator 11, the correlation between the received signal $y(t)$ and the NRZ-code reference PN-signal $P_N(t+\delta t)$ is obtained, where $\delta t$ indicates a time difference between the PN signal included in the received signal and the reference PN signal. In the correlator 11, the received signal $y(t)$ and the reference PN-signal $P_N(t+\delta t)$ are multiplied and then the resulting signal is passed through a band-pass filter which passes a signal having a frequency around the carrier frequency. Thus the signal output from the correlator 11 is given by the following expression (3):

$$\overline{P_N(t+\delta t)P_N(t)}\cos(w_0t+\phi) \quad (3).$$

Hereinafter, $$\overline{P_N(t+\delta t)P_N(t)}$$

will be referred to as A.

Hereinafter, the above line expresses that the terms under the above line, as shown in the above expression (3), are the low-frequency components thereof. Since the term A is the autocorrelation of the NRZ-code PN signal, a signal with magnitude shown in FIG. 13A as a function of $\delta t$ is output. (The correlator 11 outputs the signal shown in the above expression (3) and the absolute value unit 18 outputs the magnitude of this signal, that is, the term A.)

Similarly, in the correlator 12, since the correlation between the received signal and the Manchester-code reference PN-signal PM(t+$\delta t$) is obtained, the correlation output signal is given by the following expression (4):

$$\overline{P_M(t+\delta t)P_N(t)}\cos(w_0+\phi) \qquad (4).$$

Hereinafter, $$\overline{P_M(t+\delta t)P_N(t)}$$

will be referred to as B.

Figure 13A:
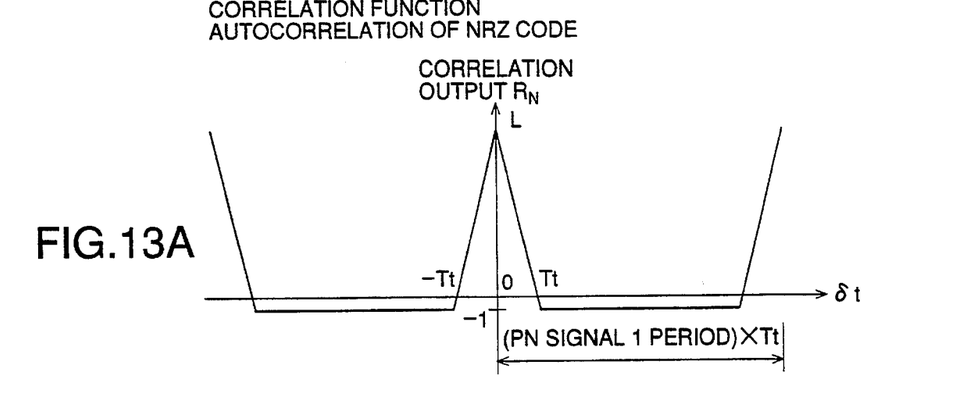
FIGS. 13A, 13B and 13C show correlation functions according to the present invention.
Figure 13B:
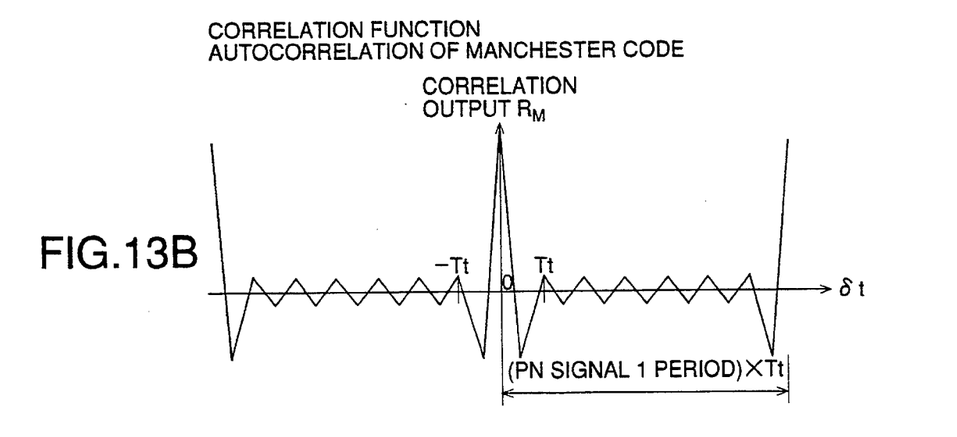
Figure 13C:
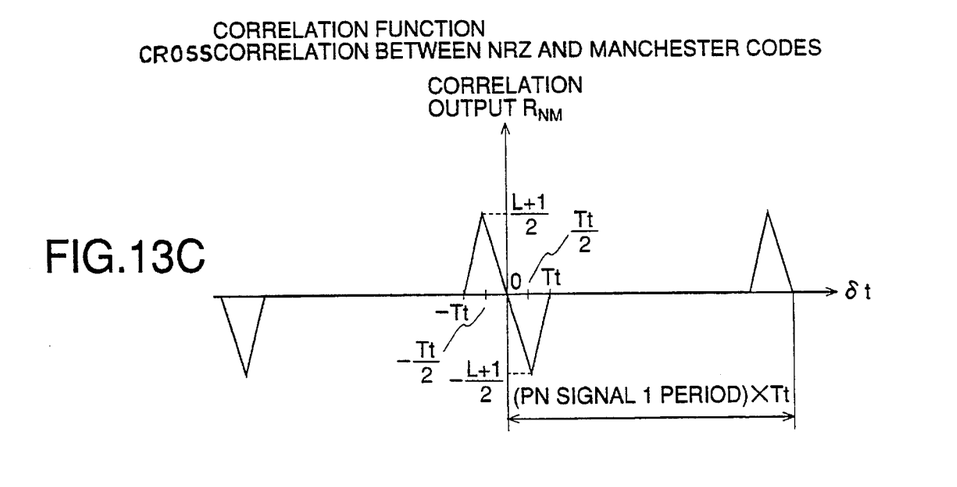

Since the term B is the cross-correlation between the NRZ-code and Manchester-code PN signals, a signal having magnitude shown in FIG. 13C is output as a function of $\delta t$. (The correlator 12 outputs the signal shown in the above expression (4) and the absolute value unit 19 outputs the magnitude of this signal, that is, the term B.) Those two correlation outputs are then multiplied by the multiplier 13 as shown in FIG. 4 and then the low-frequency component of the result of the multiplication is extracted by means of the LPF 14. The extracted signal is given by the following expression (5):

$$\overline{P_N(t+\delta t)P_N(t)} \cdot \overline{P_M(t+\delta t)P_N(t)} \qquad (5).$$

Figure 12A:
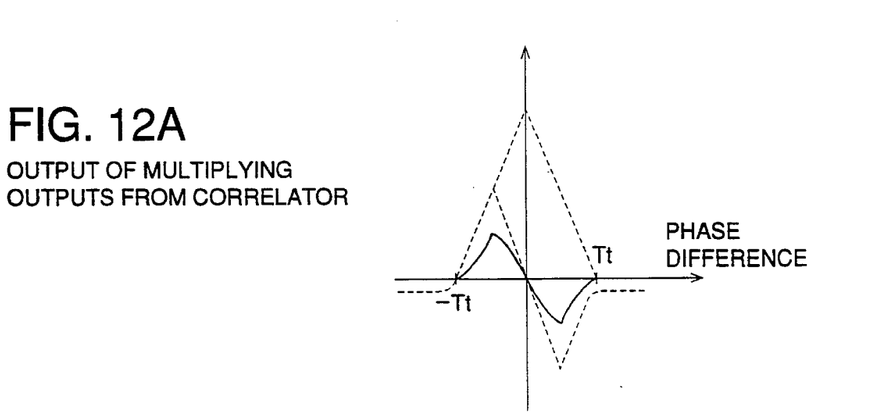
FIG. 12A shows a signal, in which δt is around 0, in the present invention, resulting from multiplying the respective outputs of two correlators, that is, resulting from multiplying respective signals shown in FIGS. 13A and 13C (respectively indicated by dashed lines in FIG. 12A)

Thus, since the output becomes one shown in FIG. 12A for the phase difference $\delta t$ in the PN signals, the phase synchronizing loop can be formed by providing the above output as the control signal for the VCC 15. There, the phase synchronizing loop is formed by the PN signal generator 16, correlators 11 and 12, the multiplier 13, LPF 14 and VCC 15-.

In this condition, if the PN signals are synchronized, that is, if $\delta t=0$, since the above term A has the magnitude shown*in FIG. 13A at $\delta t=0$, the correlator 11 outputs a sine wave having a certain magnitude. On the other hand, since the above term B has the magnitude shown in FIG. 13C at $\delta t=0$, an almost zero-magnitude signal is output by the correlator 12. Thus, since (the magnitude of the output signal of the correlator 12)<(the magnitude of the output signal of the correlator 11), the comparator outputs the logical value of 1.

Operations carried out by the receiver will now be described with reference to FIG. 4, which operations are carried out if the receiver receives the Manchester-code PN signal shown in the above expression (2).

In the correlator 11, the correlation between the received signal y(t) and the NRZ-code reference PN-signal $P_N(t+\delta t)$ is obtained. Thus the signal output from the correlator 11 is given by the following expression (6):

$$\overline{P_N(t+\delta t)P_M(t)}\cos(w_0+\phi) \qquad (6).$$

Hereinafter, $$\overline{P_N(t+\delta t)P_M(t)}$$

will be referred to as D.

In this case, since the correlator 11 obtains the crosscorrelation between the Manchester-code PN signal and the NRZ-code PN signal, the term D has the magnitude shown in FIG. 13C as a function of time difference $\delta t$. (The correlator 11 outputs the signal shown in the above expression (6) and the absolute value unit 18 outputs the magnitude of this signal, that is, the term D.) On the other hand, in the correlator 12, since the correlation between the received signal and the Manchester-code reference PN-signal $P_M(t+\delta t)$ is obtained, the correlation output signal is given by the following expression (7):

$$\overline{P_M(t+\delta t)P_M(t)}\cos(w_0+\phi) \qquad (7).$$

Hereinafter, $$\overline{P_M(t+\delta t)P_M(t)}$$

will be referred to as E.

Since the term E is the autocorrelation of the Manchester-code PN signals, the a signal with a magnitude given by FIG. 13B is output for the corresponding time difference $\delta t$. (The correlator outputs the signal shown in the above expression (7) and the absolute value unit 19 outputs the magnitude of this signal, that is, the term E.) As a result, the signal provided as the control signal for the VCC 15 is given by the following expression (8):

$$\overline{P_N(t+\delta t)P_M(t)} \cdot \overline{P_M(t+\delta t)P_M(t)} \qquad (8).$$

Figure 12B:
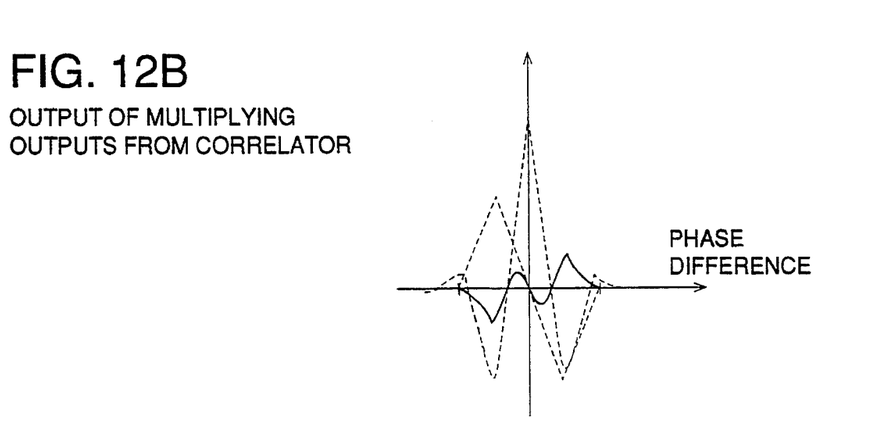
FIG. 12B shows a signal, in which δt is around 0, in the present invention, resulting from multiplying respective outputs of two correlators, that is, resulting from multiplying the respective signals shown in FIGS. 13B and 13C (respectively indicated by dashed lines in FIG. 12B)

Thus, the output is given by FIG. 12B for the phase difference $\delta t$ in the PN signals. This signal also can be used as the phase error signal at the region around $\delta t=0$, and the phase synchronizing loop and the phase synchronizing loop of PN signal can be formed with the following components: PN-signal generators 16a and 16b, correlators 11 and multiplier 13, LPF 14 and VCC 15, in the embodiment of FIG. 4.

In this condition, if the PN signals are synchronized, that is, if $\delta t=0$, since the above term D has the value shown in FIG. 13C at $\delta t=0$, the correlator 11 provides almost no output signal. On the other hand, since the term E has the value shown in FIG. 13B at $\delta t=0$, a sine wave having a certain magnitude is output from the correlator 12. Thus, since (the magnitude of the output signal of the correlator 12)>(the magnitude of the output signal of the correlator 11), the comparator thus outputs the logical value of 0.

The above described functions according to the present invention enable the receiver to follow the PN signal included in the received signal by synchronizing with it. Such synchronization is performed by the receiver both in the case where the transmitter sends the NRZ-code PN-signal and in the case where the transmitter sends the Manchester-code PN signal. Further, in the arrangement according to the present invention, by comparing the outputs provided by both the correlators, the received signal is demodulated so as to obtain the data signal associated with the received signal.

Figure 5:
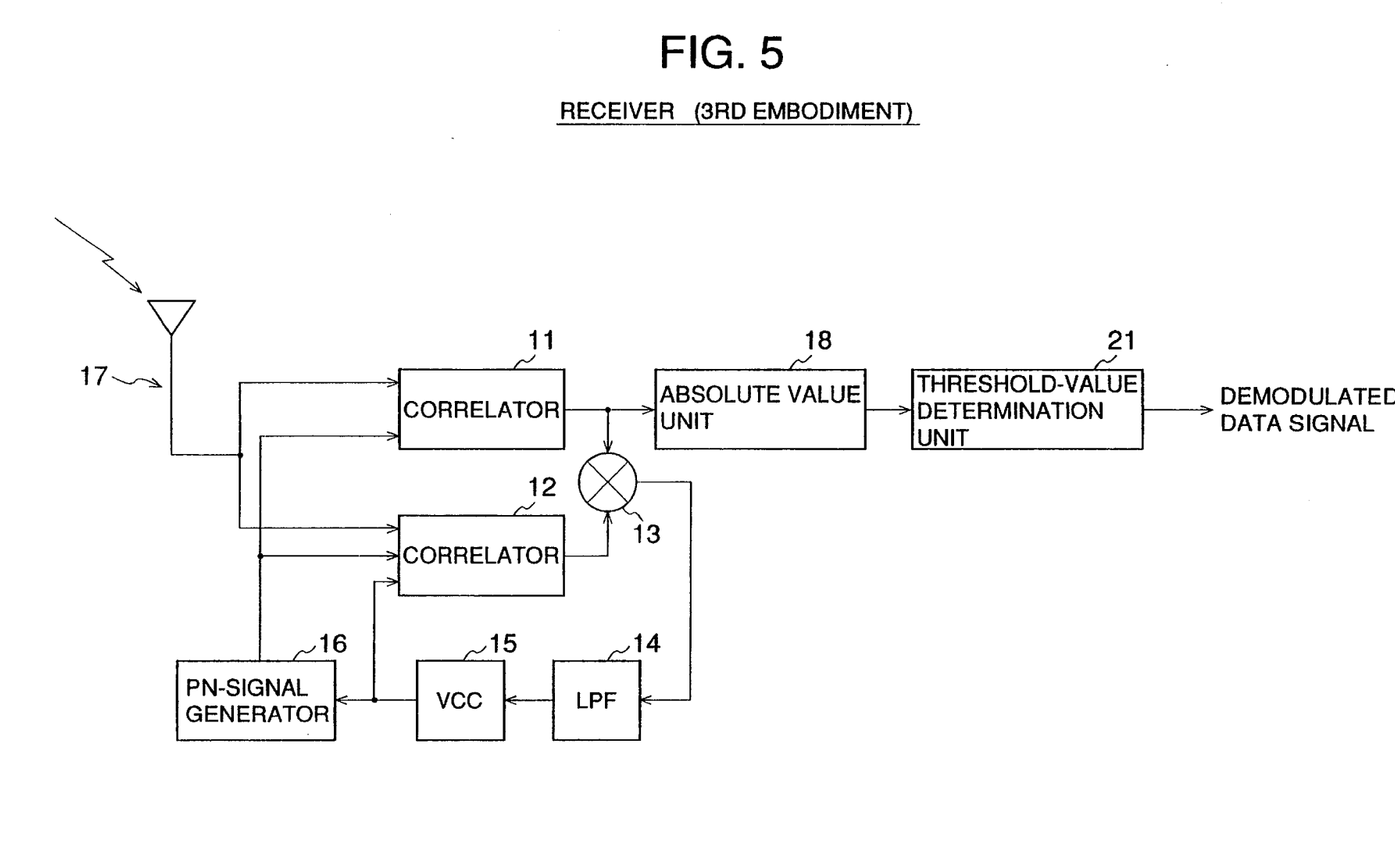
FIG. 5 shows a block diagram of a receiver in a third embodiment of a spread spectrum communication system according to the present invention.
Figure 6:
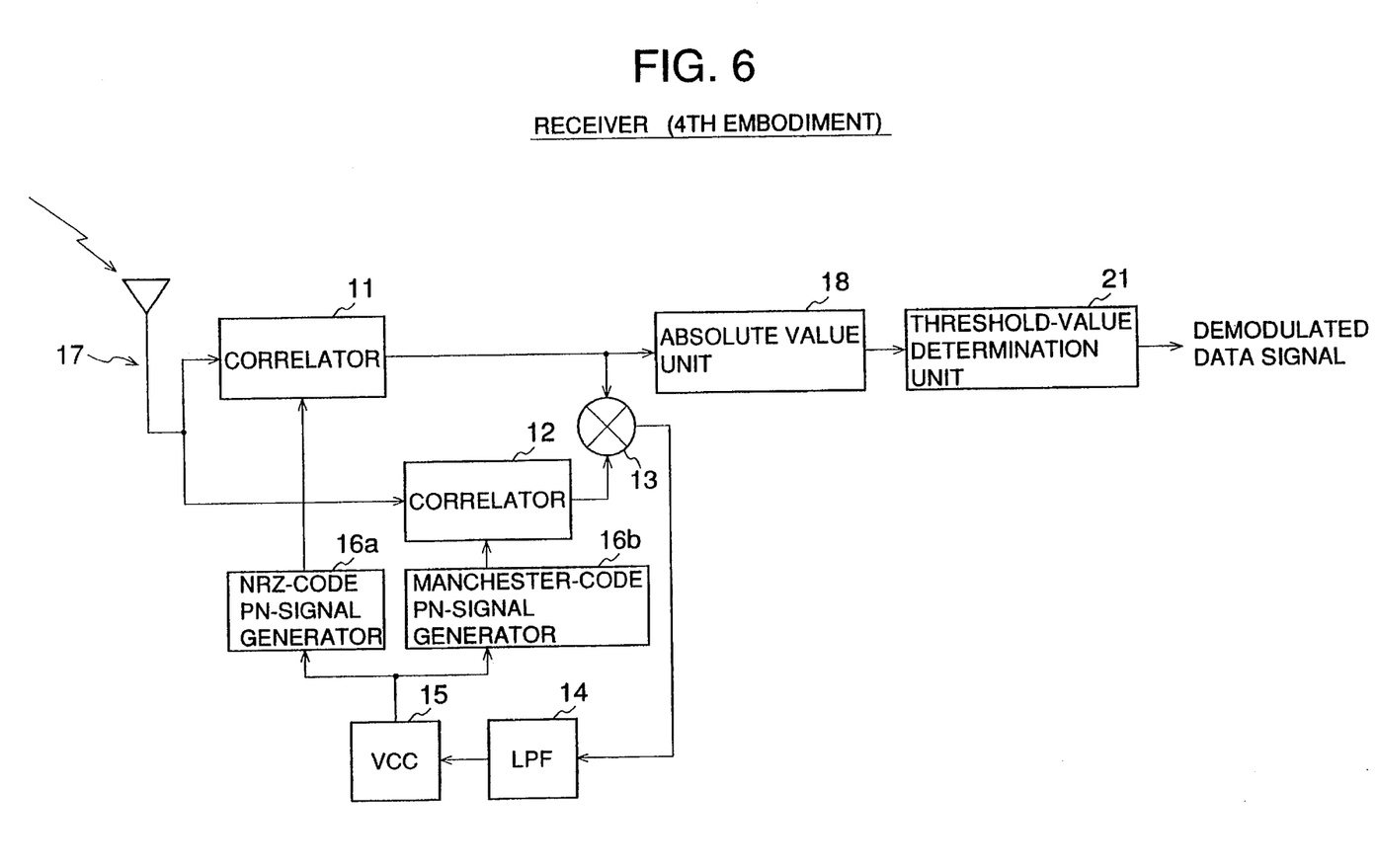
FIG. 6 shows a block diagram of a receiver in a fourth embodiment of a spread spectrum communication system according to the present invention.

In embodiments of spread spectrum communication systems according to the present invention, the comparison between respective outputs of two correlators is not always necessary in data demodulation. As shown in FIGS. 5 and 6, data demodulation may be realized as follows, for example: A magnitude is extracted from either one of outputs of two correlators by means of the absolute value unit 18. The resulting magnitude is then converted into the corresponding binary signal by means of a threshold value determination unit 21.

Figure 7:
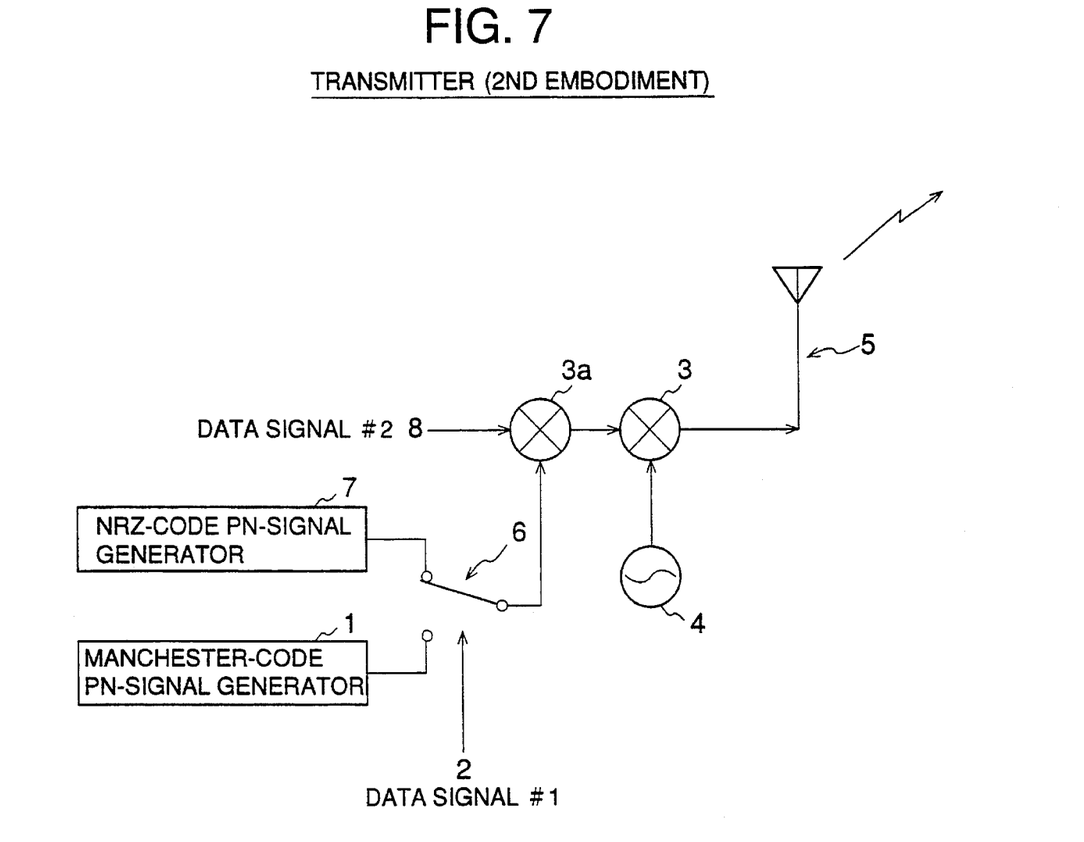
FIG. 7 shows a block diagram of a transmitter in a second embodiment of a spread spectrum communication system according to the present invention.

The present invention may be used in another manner and enabling such a manner of use is one advantage resulting from the present invention. That is, a DS system such as mentioned above is incorporated into the spread spectrum communication system according to the present invention. As a result, two data signals can be simultaneously sent thereby. An embodiment of a transmitter, according to the present invention, for this purpose is shown in FIG. 7. There, the same reference numerals are given to components, functions of which are substantially the same as those of the corresponding components in FIG. 2. The above-mentioned two data signals will be referred to as data signals #1 and #2 hereinafter. As described above, the PN signal is modulated as a result of switching between the NRZ-code PN signal and the Manchester-code PN signal using the given data signal #1. Then, the modulated PN signal is used in the spreading operation wherein the modulated PN signal is multiplied with the given data signal #2 by means of the multiplier 3a. Then, the signal resulting from the spreading operation is multiplied with the carrier provided by the carrier generator 4 so that the resulting signal is sent through the antenna 5.

Figure 8:
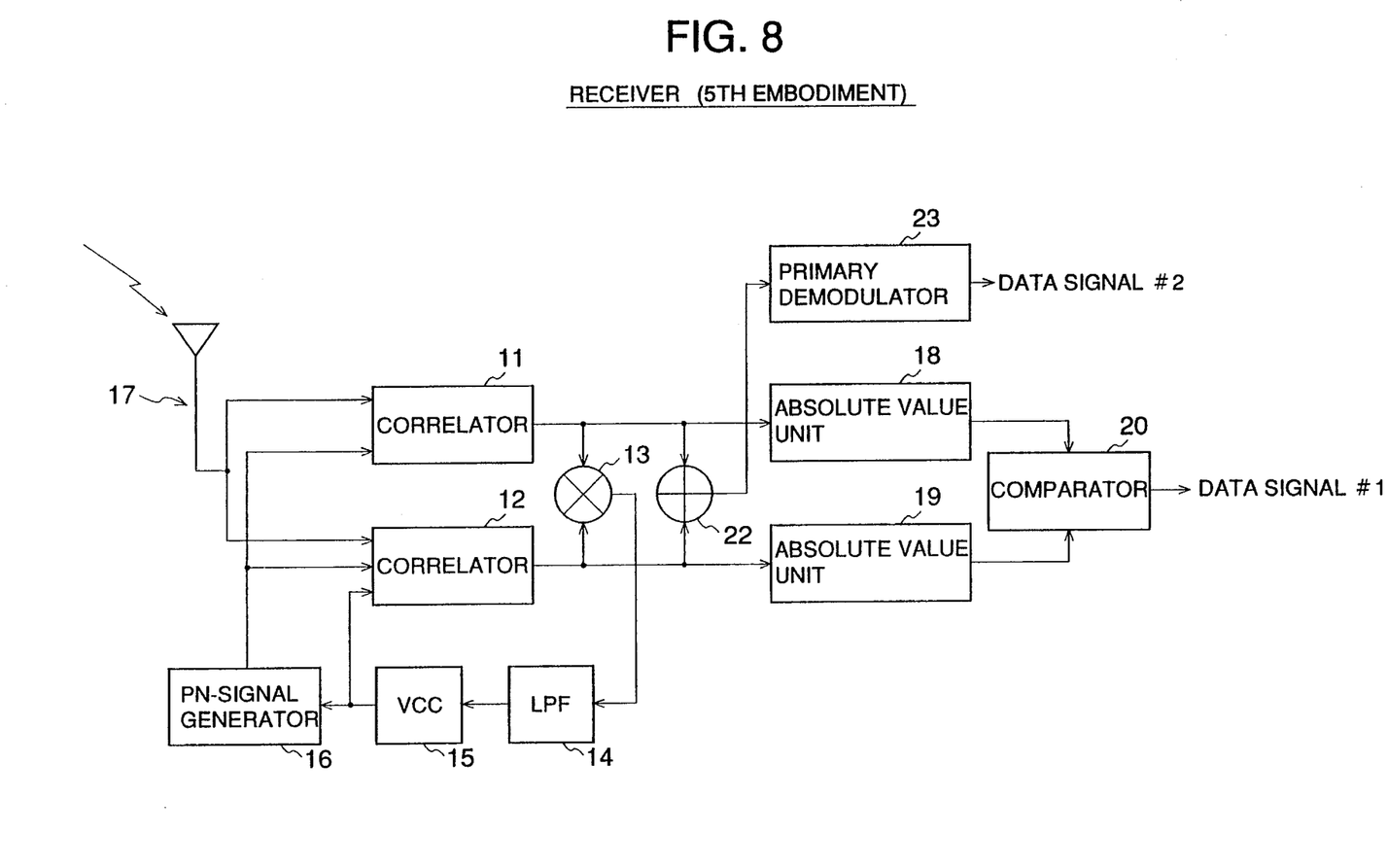
FIG. 8 shows a block diagram of a receiver in a fifth embodiment of a spread spectrum communication system according to the present invention.
Figure 9:
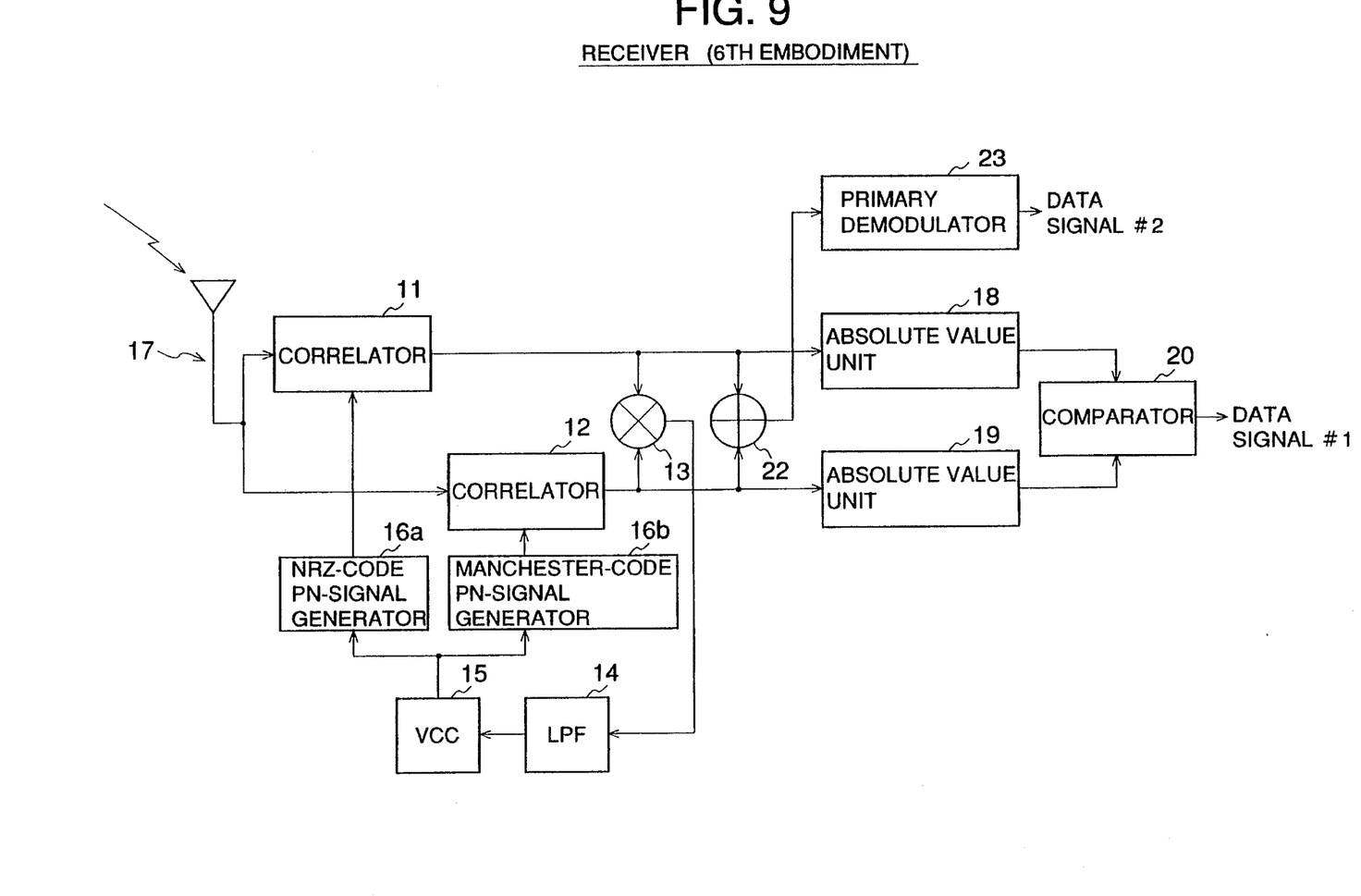
FIG. 9 shows a block diagram of a receiver in a sixth embodiment of a spread spectrum communication system according to the present invention.

An embodiment of a receiver which can receive the signal sent from the transmitter of FIG. 7 will now be described with reference to FIG. 8. There, the same reference numerals are given to components, functions of which are substantially the same as those of the corresponding components in FIG. 3. The receiver results from modifying the receiver shown in FIG. 3 by adding an adder 22 and a primary demodulator 23. Similarly, an embodiment of a receiver resulting from modifying the receiver shown in FIG. 4 by adding the adder 22 and the primary demodulator 23 is shown in FIG. 9. As described above, the receivers shown in FIGS. 8 and 9 function identically.

Operations in the above receivers will now be described with reference to FIG. 8. The data signal #1 can be obtained as a result of demodulation in the manner the same as described above. Demodulating operations for obtaining the data signal #2 will now be described. As described above, if the PN signals are synchronized, that is, if δt=0, and also if the PN signal contained in the received signal is the NRZ-code PN signal, the correlator 11 outputs the signal resulting from the inverse spreading operation and the correlator 12 outputs almost no output signal. (The state δt=0 is the state where the PN signal included in the received signal is synchronized with the reference PN signal generated in the receiver) On the other hand, if the PN signals are synchronized, that is, if δt=0, and also if the PN signal contained in the received signal is the Manchester-code PN signal, the correlator 12 outputs the signal resulting from the inverse spreading operation and the correlator 11 outputs almost no output signal.

As a result, the adder 22, which adds the respective output signals from the two correlators, always outputs either one of the inverse-spread signals. Therefore, the data signal #2 can be obtained as a result of demodulation by means of the primary demodulator 23, which is used in a DS system such as mentioned above, which demodulator 23 demodulates the signal comprising the sum of the two correlation values.

Further, the present invention is not limited to the above described embodiments, and variations and modifications may be made without departing from the scope of the present invention.

What is claimed is

1. A spread spectrum communication system having a transmission terminal which comprises:

means for modulating, for a first data state of a data signal, a first-predetermined-code pseudo-noise signal onto a carrier band;

means for modulating, for a second data state of said data signal, a second-predetermined-code pseudo-noise signal onto said carrier band; and means for transmitting a communication signal comprising said first-predetermined-code pseudo-noise signal and said second-predetermined-code pseudo-noise signal.

2. A spread spectrum communication system having a receiving terminal which comprises:

synchronizing loop means for synchronizing pseudo-noise signals, said synchronizing loop means using, as an error signal, a signal resulting from multiplication of first and second correlation signals, said first correlation signal representing a correlation between a received communication signal, a reference pseudo-noise signal, and a clock signal which is used for generating said reference pseudo-noise signal, and said second correlation signal representing a correlation between said received communication signal and said reference pseudo-noise signal; and demodulating means for demodulating said received communication signal by comparing magnitudes of said first and second correlation signals.

3. A spread spectrum communication system comprising:

a transmission terminal comprising:

means for modulating, for a first data state of data signal, a first-predetermined-code pseudo-noise signal onto a carrier band;

means for modulating, for a second data state of said data signal, a second-predetermined-code pseudo-noise signal onto said carrier band; and means for transmitting a communication signal comprising said first-predetermined-code pseudo-noise signal and said second first-predetermined-code pseudo-noise signal; and a receiving terminal for receiving said communication signal, said receiving terminal comprising:

synchronizing loop means for synchronizing pseudo-noise signals, said synchronizing loop means using, as an error signal, a signal resulting from multiplication of first and second correlation signals, said first correlation signal representing a correlation between said communication signal, a reference pseudo-noise signal, and a clock signal which is used for generating said reference pseudo-noise signal; and said second correlation signal representing a correlation between said communication signal and said reference pseudo-noise signal; and demodulating means for demodulating said communication signal by comparing magnitudes of said first and second correlation signals.

4. A spread spectrum communication system having a receiving terminal which comprises:

synchronizing loop means for synchronizing pseudo-noise signals, said synchronizing loop means using, as an error signal, a signal resulting from multiplication of first and second correlation signals, said first correlation signal representing a correlation between a received communication signal and a first-predetermined-code pseudo-noise signal, and said second correlation signal representing a correlation between said received communication signal and a second-first-predetermined-code pseudo-noise signal;

and demodulating means for demodulating said received communication signal by comparing magnitudes of said first and second correlation signals.

5. A spread spectrum communication system comprising:

a transmission terminal comprising:

means for modulating, for a first data state of a data signal, a first-predetermined-code pseudo-noise signal onto a carrier band;

means for modulating, for a second data state of said data signal, a second-predetermined-code pseudo-noise signal onto said carrier band; and means for transmitting a communication signal comprising said first-predetermined-code pseudo-noise signal and said second-predetermined-code pseudo-noise signal.

a receiving terminal, for receiving said communication signal sent from said transmission terminal, said receiving terminal comprising:

synchronizing loop means for synchronizing pseudo-noise signals, said synchronizing loop means using, as an error signal, a signal resulting from multiplication of first and second correlation signals, said first correlation signal representing a correlation between a received communication signal and a first-predetermined-code pseudo-noise signal, and said second correlation signal representing a correlation between said received communication signal and a said second-first-predetermined-code pseudo-noise signal; and demodulating means for demodulating said received communication signal by comparing magnitudes of said first and second correlation signals.

6. The spread spectrum communication system according to claim 2, wherein said demodulating means determines the magnitude of one of said first and second correlation signals.

7. The spread spectrum communication system according to claim 4, wherein said demodulating means determines the magnitude of one of said first and second correlation signals.

8. A spread spectrum communication system comprising a transmission terminal, for sending first and second data signals, comprising:

first modulating means for switching, using said first signal, a pseudo-noise signal in either a first predetermined code or a second predetermined code so as to modulate said pseudo-noise signal; and second modulating means for multiplying said second data signal with the modulated pseudo-noise signal and a carrier signal so as to transmit the resulting signal as a communication signal.

9. A spread spectrum communication system having a receiving terminal which comprises:

synchronizing loop means for synchronizing pseudo-noise signals, said synchronizing loop means using, as an error signal, a signal resulting from multiplication of first and second correlation signals, said first correlation signal representing a correlation between a received communication signal and a first-predetermined-code pseudo-noise signal, and said second correlation signal representing a correlation between said received communication signal and a second-first-predetermined-code pseudo-noise signal;

first demodulating means for demodulating said received communication signal so as to obtain a first data signal by comparing magnitudes of said first and second correlation signals; and second demodulating means for demodulating said received communication signal so as to obtain a second data signal, by means of a primary demodulating system, as a result of adding said first and second correlation signals.

10. A spread spectrum communication system comprising:

a transmission terminal, for sending first and second data signals, comprising:

first modulating means for switching, using said first data signal, a pseudo-noise signal into either a first predetermined code or a second predetermined code so as to modulate said pseudo-noise signal; and second modulating means for multiplying said second data signal with the modulated pseudo-noise signal and a carrier signal so as to transmit the resulting signal as a communication signal; and a receiving terminal, for receiving said communication signal sent from said transmission terminal, comprising:

synchronizing loop means for synchronizing pseudo-noise signals, said synchronizing loop means using, as an error signal, a signal resulting from multiplication of first and second correlation signals, said first correlation signal representing a correlation between said communication signal, a reference pseudo-noise signal, and a clock signal which is used for generating said reference pseudo-noise signal, and said second correlation signal representing a correlation between said communication signal and said reference pseudo-noise signal;

first demodulating means for demodulating said communication signal so as to obtain said first data signal by comparing magnitudes of said first and second correlation signals; and second demodulating means for demodulating said communication signal so as to obtain said second data signal, by means of a primary demodulating system, as a result of adding said first and second correlation signals.

11. A spread spectrum communication system having a receiving terminal which comprises:

synchronizing loop means for synchronizing pseudo-noise signals, said synchronizing loop means, using, as an error signal, a signal resulting from multiplication of first and second correlation signals, said first correlation signal representing a correlation between a received communication signal and a first-predetermined-code reference pseudo-noise signal, and said second correlation signal representing a correlation between said received communication signal and a second-predetermined-code reference pseudo-noise signal;

first demodulating means for demodulating said received communication signal, so as to obtain a first signal, by comparing magnitudes of said first and second correlation signals; and second demodulating means for demodulating said received communication signal so as to obtain a second data signal, by means of a primary demodulating system, as a result of adding said first and second correlation signals.

12. A spread spectrum communication system comprising:

a transmission terminal, for transmitting first and second data signals, said transmission terminal comprising:

first modulating means for switching, using said first signal, a pseudo-noise signal to either a first predetermined code or a second predetermined code so as to modulate said pseudo-noise signal; and second modulating means for multiplying said second data signal with the modulated pseudo-noise signal and a carrier signal so as to transmit a resulting signal as a communication signal; and a receiving terminal comprising:

synchronizing loop means for synchronizing pseudo-noise signals, said synchronizing loop means, using, as an error signal, a signal resulting from multiplication of first and second correlation signals, said first correlation signals, said first correlation signal representing a correlation between said communication signal and said-first-predetermined-code reference pseudo-noise signal, and said second correlation signal representing a correlation between said communication signal and a second-predetermined code reference pseudo-noise signal;

first demodulating means for demodulating said communication signal, so as to obtain a first signal, by comparing magnitudes of said first and second correlation signals; and second demodulating means for demodulating said communication signal so as to obtain a second data signal, by means of a primary demodulating system, as a result of adding said first and second correlation signals.

13. The spread spectrum communication system according to claim 1, wherein:

said first predetermined code comprises a non-return-to-zero code; and said second predetermined code comprises a Manchester code.

14. The spread spectrum communication system according to claim 3, wherein:

said first predetermined code comprises a non-return-to-zero code; and said second predetermined code comprises a Manchester code.

15. The spread spectrum communication system according to claim 4, wherein:

said first predetermined code comprises a non-return-to-zero code; and said second predetermined code comprises a Manchester code.

16. The spread spectrum communication system according to claim 5, wherein:

said first predetermined code comprises a non-return-to-zero code; and said second predetermined code comprises a Manchester code.

17. The spread spectrum communication system according to claim 8, wherein:

said first predetermined code comprises a non-return-to-zero code; and said second predetermined cods comprises a Manchester code.

18. The spread spectrum communication system according to claim 10, wherein:

said first predetermined code comprises a non-return-to-zero code; and said second predetermined code comprises a Manchester code.

19. The spread spectrum communication system according to claim 11, wherein:

said first predetermined code comprises a non-return-to-zero code; and said second predetermined code comprises a Manchester code.

20. The spread spectrum communication system according to claim 12, wherein:

said first predetermined code comprises a non-return-to-zero code; and said second predetermined code comprises a Manchester code.

21. A communication system comprising:

means for modulating plural pseudo-noise signals onto a carrier in response to plural data states of a data signal; and means for transmitting a communication signal comprising said plural pseudo-noise signals.

* * * * *